UNITED STATES PATENT OFFICE 1,994,412

JOINTING, PACKING, SEALING, AND LIKE MATERIALS

Vincent Gregory Walsh, Stanmore Park, England

No Drawing. Application November 19, 1932, Serial No. 643,529. In Great Britain September 28, 1932

17 Claims. (Cl. 18—50)

The present invention relates to improvements in or relating to jointing, packing, sealing and like materials and particularly to the manufacture of improved materials suitable for use as substitutes for cork.

The use of cork as a packing or jointing material is attended with various disadvantages. Cork generally has holes in it which permit of a fluid in any container closed by it to penetrate into and sometimes through the cork, in some cases dissolving substances contained in the cork in the process. Moreover, where cork discs inserted within metal caps are used as closure means for bottles, the like difficulties have occurred owing to the fluid contained in the bottle coming into contact with the metal and sometimes dissolving portions thereof. For example in the case of aerated waters, or beverages the presence of dissolved carbon dioxide gives rise to risk of contamination with metal. Moreover, cork discs cut from the whole cork tend to crack under the conditions of use whilst composition corks tend to disintegrate. A further disadvantage of the use of cork and cork compositions is that they are liable to impart a flavour to beverages in containers sealed by them. This latter disadvantage also applies to seals made of rubber or rubber substitutes. These substances frequently contain oils and resinous materials which may impart both odour and taste to beverages or other foods contacting with them.

It is an object of the present invention to provide an improved jointing, packing and like material which is impervious to liquids and gases and is unaffected by water or alcohol.

It is a further object of the invention to provide an improved cork substitute suitable inter alia for sealing containers for aerated or non-aerated, alcoholic or non-alcoholic beverages. Another object of the invention is to provide an improved cork substitute which will not impart any taste or odour to beverages or other materials sealed thereby.

A further object of the invention is to provide an improved jointing, packing, sealing and like materials containing silica and latex.

It is a further object of the invention to provide an improved method of manufacturing the new jointing, packing, sealing and like material.

According to the present invention an improved packing, jointing, sealing or like material comprises silica and latex, rubber or the like either with or without one or more other fillers and with or without one or more other binding agents.

As a filler, in addition to the silica, it is preferred to employ wood pulp. Moreover, if desired, the improved material may also contain other substances such as alumina and particularly if the material is required to withstand very high pressures it is prefererd to incorporate a body of oily, fatty or wax-like character in the material.

The invention further comprises a method of manufacturing an improved jointing, packing, sealing and like material including the steps of preparing an intimate mixture of silica, a filler preferably wood pulp, and latex and preferably with an aqueous medium, in the form of a paste or cream and coagulating the latex. The coagulum is then preferably dried and moulded while hot and under pressure to any desired form. It is preferred to precipitate the silica in hydrated form. The moulded mass may be cut into any desired shapes, or again it may be disintegrated by suitable means and remoulded under heat and pressure.

In order that the invention may be well understood a preferred method of manufacturing an improved material according to this invention will now be described by way of example only.

First an intimate mixture of about 100 parts by weight of silica and about 8 parts by weight of wood pulp is mixed with sufficient water to produce a paste or cream. It will be understood that the silica may be finely ground and then mixed with the wood pulp but it is preferred to carry out this first step of the process by precipitation of silica in a hydrated form from a solution of sodium silicate. Such a solution may contain approximately one tenth of its weight of silica (e. g. 1 part by weight of water glass solution of 36% silica strength with 3 parts by weight of water).

The requisite quantity of this solution (i. e. the amount containing about 100 parts by weight of silica) is mixed with 8 parts by weight of wood pulp and hydrated silica is precipitated in the pulp by the addition of an ammonium salt preferably the sulphate or chloride in aqueous solution and in an amount sufficient to combine chemically with the whole of the sodium silicate. This reaction causes the formation not only of a hydrated form of silica which is precipitated in the wood pulp, but also of by-products, namely, sodium chloride or sulphate, according to which ammonium salt was used and free ammonia. These by products are held in solution and are for the most part removed from the precipitated silica and wood pulp by filtration or decantation. If desired, however, an acid may be employed to precipitate the silica, and in that case the sodium salt of the acid is removed by filtration or decantation. A mass composed of hydrated silica and wood pulp is thus obtained either as a damp mass as a result of filtration, or as a mass of creamy consistency by decantation. To the paste containing about 100 parts by weight of silica (preferably hydrated as above described) and about 8 parts by weight of wood pulp are added about 30 parts by weight of rubber latex. The whole is then well mixed to a mass of creamy consistency. If the materials to be produced are required to withstand very high pressures it is advantageous to add to this cream or preferably to the latex itself about 5 parts by weight of an oily, fatty or wax-like body in suspension or solution in a suitable solvent or diluent. It is preferred to add for this purpose sodium stearate or a pure hard soap containing this as its chief ingredient. The mass consisting of silica (preferably hydrated), wood pulp, latex and in some cases sodium stearate is rendered slightly acid to coagulate the latex by the addition of any suitable reagent such as sulphuric, hydrochloric or acetic acid, or a salt having an acid reaction. The acid or salt is added in dilute solution and the amount to be added will depend not only upon the amount of latex used but also upon the amount of ammonia which is usually added to the latex for its preservation. Moreover, if any sodium stearate has been added to the mass as above described, then a further quantity of the acid reagent is required. As an acid reagent it is preferred to employ potassium alum. Upon acidification there results a coagulum consisting of silica (preferably hydrated), wood pulp, latex, probably some hydrated alumina formed by the action of the ammonia in the latex on the potassium alum and in some cases also an ingredient of an oily, fatty or wax like nature. This coagulum is separated by decantation, filtration or pressure from the supernatant liquid, containing sulphates of potassium and ammonium formed in the step of acidification with alum. The coagulum may then be dried and moulded while hot and under pressure into any desired shapes. When cold the compressed mass may be cut into any desired shapes such for example as discs or cylinders or it may be disintegrated by means of any suitable machine and remoulded under heat and pressure.

Whilst in the foregoing I have described a preferred method of carrying out this invention it is to be understood that the proportions of ingredients and manipulative details may be varied or modified without departing from the scope thereof.

I claim:—

1. A method of making cork substitutes and like sealing materials including the steps of preparing an intimate mixture of a major proportion of silica and minor proportions of wood pulp and latex in an aqueous medium and coagulating the latex.

2. A method of making cork substitutes and like sealing materials including the steps of preparing an intimate mixture of a major proportion of silica and minor proportions of wood pulp, latex and alumina and then coagulating the latex.

3. A method of making cork substitutes and like sealing materials including the steps of preparing an intimate mixture of a major proportion of silica and minor proportions of wood pulp, latex and a fatty substance and then coagulating the latex.

4. A method of making cork substitutes and like sealing materials including the steps of preparing an intimate mixture of a major proportion of silica and minor proportions of wood pulp, latex, alumina and a body of the group of oils, fats and waxes and then coagulating the latex.

5. A method of making cork substitutes and like sealing materials including the steps of mixing a minor proportion of wood pulp with an aqueous solution containing a major proportion of sodium silicate, precipitating silica in hydrated form in the wood pulp, removing the bulk of the liquid, mixing the resultant mass with a minor proportion of latex to produce a creamy mass and then coagulating the latex.

6. A method of making cork substitutes and like sealing materials including the steps of preparing an intimate mixture of a major proportion of hydrated silica and minor proportions of wood pulp, and latex in an aqueous medium, and coagulating the latex by the addition of potassium alum.

7. A method of making cork substitutes and like sealing materials including the steps of preparing an intimate mixture of a major proportion of hydrated silica and minor proportions of wood pulp, a body of the group of oils, fats and waxes, and latex in an aqueous medium to form a creamy mass, and coagulating the latex by the addition of potassium alum.

8. A method of making cork substitutes and like sealing materials including the steps of mixing a minor proportion of wood pulp with an aqueous solution of a major proportion of sodium silicate, precipitating silica in hydrated from in the wood pulp by means of an ammonium salt, removing the bulk of the liquid, mixing the resulting mass with minor proportions of latex and sodium stearate to produce a creamy mass, coagulating the latex by acidifying, separating the coagulum from the supernatant liquid, drying the coagulum and moulding it to desired shape under the action of heat and pressure.

9. A method of making cork substitutes and like sealing materials including the steps of preparing an intimate mixture of a major proportion of hydrated silica and minor proportions of wood pulp and latex, coagulating the latex, drying the coagulum and moulding it while hot and under pressure.

10. A method of making cork substitutes and like sealing materials including the steps of mixing a minor proportion of wood pulp with an aqueous solution containing a major proportion of sodium silicate, precipitating the silica of the sodium silicate in hydrated form in the wood pulp, removing the bulk of the liquid, mixing the resulting mass with a minor proportion of latex, coagulating the latex, drying the coagulum, and moulding it while hot and under pressure.

11. A method of making cork substitutes and like sealing materials including the steps of mixing a minor proportion of wood pulp with an aqueous solution containing a major proportion of sodium silicate, precipitating the silica of the sodium silicate in hydrated form in the wood pulp, mixing with the resulting mass a minor proportion of latex to which has been added a small quantity of sodium stearate, coagulating the latex by means of a salt having an acid reaction, drying the coagulum, and moulding it while hot and under pressure.

12. A method of making cork substitutes and like sealing materials including the steps of making an intimate mixture of a major proportion of hydrated silica and minor proportions of wood pulp and latex in an aqueous medium, coagulating the latex by means of a salt having an acid reaction, drying the coagulum, and moulding it while hot and under pressure.

13. A method of making cork substitutes and like sealing materials including the steps of making an intimate mixture of a major proportion of hydrated silica and minor proportions of wood pulp, latex and a fatty acid salt in an aqueous medium, coagulating the latex by means of potassium alum, drying the coagulum and moulding it while hot under pressure.

14. A cork substitute or like sealing material comprising an intimate mixture of a major proportion of silica and minor proportions of wood pulp and coagulated latex.

15. A cork substitute comprising an intimate mixture of a major proportion of silica and minor proportions of wood pulp, coagulated latex and a substance of the group of oils, fats and waxes, the coagulated latex serving as a binding medium.

16. A cork substitute comprising a major proportion of silica and minor proportions of wood pulp, alumina and coagulated latex.

17. A cork substitute comprising a moulded body of a major proportion of silica and minor proportions of wood pulp, a substance of the group of oils, fats and waxes, alumina and coagulated latex.

VINCENT GREGORY WALSH.